C. P. KERTELL.
COMBINED REIN HOLDER AND HOLDBACK.
APPLICATION FILED MAY 18, 1909.
935,520.
Patented Sept. 28, 1909.
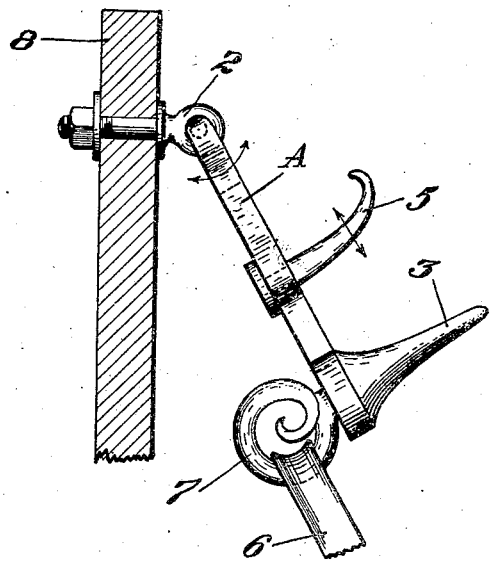
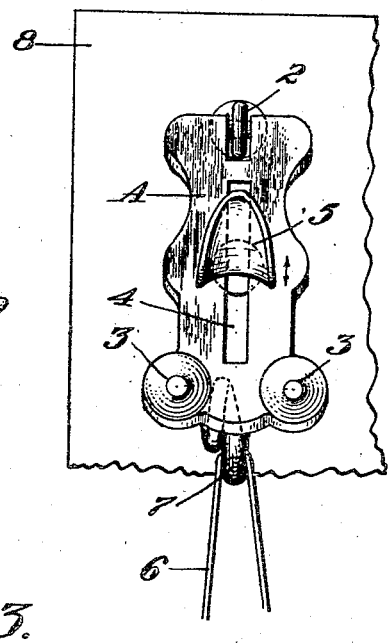
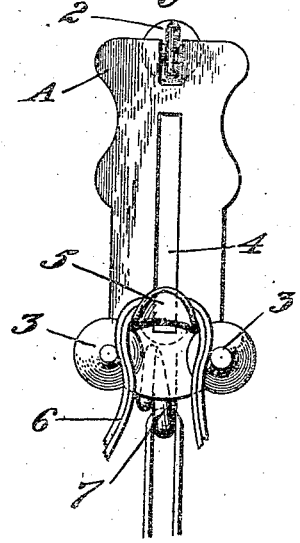
WITNESSES:
INVENTOR
CHARLES P. KERTELL.
BY George H. Strong
HIS ATTORNEY.

UNITED STATES PATENT OFFICE.

CHARLES P. KERTELL, OF OAKLAND, CALIFORNIA.

COMBINED REIN-HOLDER AND HOLDBACK.

935,520. Specification of Letters Patent. Patented Sept. 28, 1909.

Application filed May 18, 1909. Serial No. 496,817.

*To all whom it may concern:*

Be it known that I, CHARLES P. KERTELL, citizen of the United States, residing at Oakland, in the county of Alameda and State of California, have invented new and useful Improvements in Combined Rein-Holders and Holdbacks, of which the following is a specification.

My invention relates to a device for holding reins.

The object of the invention is to provide a simple, cheap, practical and adjustable attachment to go on a vehicle seat or dashboard or other suitable point of support of the vehicle, whereby the free ends of the lines may be always engaged so that there will be no danger of runaways resulting from the driver losing the lines, and also in which device there will be means provided to grip the lines so as to hold back the horse or team whenever it is necessary for the driver to get off the seat, and where there is no convenient means for otherwise tying or securing the animal or animals.

The invention consists of the parts and the construction and combination of parts as hereinafter more fully described and claimed, having reference to the accompanying drawings, in which—

Figure 1 is a side elevation of the invention. Fig. 2 is a front view. Fig. 3 is a front view showing the reins in the locked position.

A represents a plate of suitable size, shape and material, which is adapted to be attached to a seat or other point of support by suitable means, as the eyebolt 2. The forward end of the plate is provided at its corners with two horns 3, and the plate is lengthwise slotted, as shown at 4, to accommodate the shank of the sliding horn 5, which latter is adapted to coöperate with the side horns 3 in gripping a pair of lines or reins 6 when the horn 5 is moved forward toward and between the fixed horns 3. The horn 5 is preferably curved backwardly at its upper ends, as shown, to prevent the lines slipping up over it, and the shank of the horn 5 is headed on its underside so as to prevent its withdrawal from the slot 4 and at the same time permit the horn to have a free sliding movement back and forth in the slot. The underside of the plate A is provided with a suitable hook or bill member 7, by which the free ends of the reins are engaged at all times.

In practice this device is secured to a seat or other suitable point of support on the vehicle, as represented at 8, the plate A pivoting in the eye of the bolt 2, and usually hanging downward. The connected ends of the lines are loosely hooked into the bill member 7, which is designed to hold the lines at all times, and without interfering with the driving. If it is desired to rein back the team and hold it while the driver dismounts, the lines are simply looped in the manner shown in Fig. 3, and this loop engaged over the horn 5 and between the stationary horns 3 and the horn 5 then pulled forward so that it acts wedge-fashion to bind the looped ends 6 of the reins against the fixed horns 3.

Practice shows that the lines cannot be drawn from this holder, yet they can easily be removed therefrom by simply backing up the horn 5.

Having thus described my invention, what I claim and desire to secure by Letters-Patent, is—

1. A rein holder comprising a plate having a longitudinal guide and a pair of fixed horns, and an intermediate horn slidably mounted in said guide so that it may be moved toward and from said fixed horn.

2. A rein holder comprising a plate pivotally supported at one end, the opposite end having a pair of fixed horns, said plate being slotted between its ends, and a movable horn adjustable in said slot and coöperating with the fixed horns.

In testimony whereof I have hereunto set my hand in presence of two subscribing witnesses.

CHARLES P. KERTELL.

Witnesses:
 JOSIE MCARTHUR,
 C. G. TALBOTT.